(12) United States Patent
Johnson

(10) Patent No.: US 8,414,260 B2
(45) Date of Patent: Apr. 9, 2013

(54) CONTROL SYSTEM FOR CONTROLLING PROPELLER AIRCRAFT ENGINE DURING TAKEOFF

(75) Inventor: James R. Johnson, Powder Springs, GA (US)

(73) Assignee: Lockheed Martin CorporationMD (US)

( * ) Notice: Subject to any disclaimer, the term of this patent is extended or adjusted under 35 U.S.C. 154(b) by 1272 days.

(21) Appl. No.: 11/459,756

(22) Filed: Jul. 25, 2006

(65) Prior Publication Data

US 2008/0029653 A1 Feb. 7, 2008

(51) Int. Cl.
*B64C 11/34* (2006.01)
*B64C 13/18* (2006.01)

(52) U.S. Cl.
USPC .............................................. 416/1; 244/175

(58) Field of Classification Search ................ 416/1, 25, 416/27–30; 60/233; 244/175
See application file for complete search history.

(56) References Cited

U.S. PATENT DOCUMENTS

| | | | | |
|---|---|---|---|---|
| 2,667,228 A * | 1/1954 | Wood et al. | ...................... | 416/28 |
| 4,772,180 A * | 9/1988 | Walker et al. | ................... | 416/33 |
| 4,958,289 A * | 9/1990 | Sum et al. | ........................ | 701/99 |
| 5,107,674 A * | 4/1992 | Wibbelsman et al. | .......... | 60/778 |
| 5,315,819 A * | 5/1994 | Page et al. | ................... | 60/39.282 |
| 6,171,055 B1 * | 1/2001 | Vos et al. | ........................... | 416/1 |
| 6,340,289 B1 * | 1/2002 | Vos et al. | ........................... | 416/1 |
| 7,011,498 B2 * | 3/2006 | Vos et al. | ........................ | 416/28 |
| 2004/0215375 A1 * | 10/2004 | Andre et al. | ..................... | 701/14 |
| 2005/0118021 A2 * | 6/2005 | Vos et al. | ........................ | 416/25 |
| 2007/0110577 A1 * | 5/2007 | Danielson | ......................... | 416/1 |

FOREIGN PATENT DOCUMENTS

EP 1293427 3/2003

OTHER PUBLICATIONS wikipedia "FADEC". http://en.wikipedia.org/wiki/FADEC.*

* cited by examiner

*Primary Examiner* — Tien Dinh
(74) *Attorney, Agent, or Firm* — Gardner Groff Greenwald & Villanueva, PC

(57) ABSTRACT

A control system and method of controlling a propeller aircraft engine during takeoff limits the amount of engine power developed at the very beginning of the takeoff in order to maximize thrust and minimize rollout distances. The control system limits the amount of power developed by the engine, even in the face of a nominal demand by the pilot for maximum engine power. Instead, the control system provides something significantly less than full power at the beginning of takeoff and gradually increases the power developed by the engine to full power as the airspeed increases. This gradual increase from partial engine power toward full power helps prevent stalling of the propeller, thereby maximizing the effectiveness of the propeller and engine in assisting the aircraft to takeoff quickly. The control system is particularly helpful for taking off from high-altitude runways.

18 Claims, 4 Drawing Sheets

US 8,414,260 B2

CONTROL SYSTEM FOR CONTROLLING PROPELLER AIRCRAFT ENGINE DURING TAKEOFF

BACKGROUND OF THE INVENTION

Technical Field

The present invention relates generally to propeller airplanes and more particularly relates to an engine control system for controlling a propeller engine during takeoff so as to maximize thrust and minimize rollout distance.

Modern propeller aircraft often have engine control systems and variable pitch propellers. The engine control systems in many aircraft are designed to operate the engine at a constant speed in order to maximize efficiency, output, fuel economy, or longevity. While maintaining a constant rotational speed (rpm), the power output of the engine can be varied by modulating the amount of fuel fed to the engine. Additionally, the pitch or angle of attack of the propeller blades can be modulated so as to vary the speed and amount of thrust developed at the propeller (and power absorbed from the engine).

Conventional wisdom, particularly among pilots, holds that to maximize thrust one would maximize the horsepower developed at the engine by providing maximum fuel flow to the engine and then harnessing this maximum power output of the engine to an aggressive propeller pitch or angle of attack. During takeoff, conventionally maximum power is applied to the propellers to presumably provide maximum thrust and lift to assist in takeoff. The present inventor has discovered, however, that at low airspeeds, such as are typical during takeoff, greater amounts of engine power can actually reduce the amount of thrust developed at the propeller due to the increase in propeller blade angle past optimum relative to the airflow in order to control propeller rotation speed. Unfortunately, a pilot's natural inclination is to demand of the aircraft that the engine produce maximum power at takeoff, which under certain circumstances can actually produce less than optimum thrust for takeoff. This can result in longer takeoff roll distances (how much runway is needed for takeoff). Additionally, this problem becomes more severe as the altitude of the runway increases because the density of the air generally decreases with elevation. As such, less air is available for the absorption of power by the propeller to control blade speed which may result in the stalling of the propeller.

Accordingly, it can be seen that a need yet remains in the art for a control system which is effective to maximize propeller thrust during takeoff conditions, despite a nominal demand from the pilot for maximum engine power to be applied. It is to the provision of such a control system that the present invention is primarily directed.

SUMMARY OF THE INVENTION

Briefly described, in a first preferred form the present invention comprises a control system and method for controlling a propeller aircraft engine during takeoff. The control system and method uses the airspeed of the aircraft and an ambient atmospheric condition as inputs. Using these inputs, the control system modulates the engine power so as to maximize propeller thrust, rather than maximizing engine power or engine speed during takeoff. Preferably, the control system also uses the propeller blade angle as an input.

In another preferred form, the present invention comprises a control system and method of controlling a propeller aircraft engine during takeoff. The control system and method limits the amount of engine power developed at the very beginning of the takeoff in order to maximize thrust and minimize takeoff roll distances. The control system limits the amount of power developed by the engine, even in the face of a nominal demand by the pilot for maximum engine power. Instead, the control system provides something significantly less than full power at the beginning of takeoff and gradually increases the power developed by the engine to full power as the airspeed increases. This gradual increase from partial engine power toward full power helps prevent stalling of the propeller, thereby maximizing the effectiveness of the propeller and engine in assisting the aircraft to takeoff quickly.

In still another preferred form, the present invention comprises a control system for controlling an engine of a propeller aircraft of the type piloted by a pilot. The control system is operable to control the engine during takeoff. The system is comprised of an electronic controller for controlling the engine while the aircraft is taking off. The controller determines the maximum effective power that can be applied to the propeller and compares the maximum effective power with the power being requested by the pilot of the aircraft. If the power demanded by the pilot is less than the maximum effective power, the controller applies the power demanded. However, if the power demanded is more than the maximum effective power, the controller applies the maximum effective power.

Advantageously, the present inventor has discovered that for a particular given airspeed and atmospheric condition, there is a maximum amount of engine power that can be effectively applied to the propeller. If more power is applied for this given airspeed and atmospheric condition, the additional power is counterproductive and results in less thrust, not more. One practical way to implement the present invention is to test an engine and propeller combination to determine how much power can be applied effectively by the engine for a given airspeed and atmospheric condition. This data can be then provided in a lookup table that the control system can access to determine the optimal amount of power to provide to maximize the thrust given the aircraft's airspeed and atmospheric condition. One way to create this lookup table is to measure the thrust output for the particular engine operating at various horsepower levels plotted against airspeed. This same testing regime is repeated for a variety of atmospheric conditions to build a multi-dimensional data table. The control system picks the horsepower output level which provides maximum thrust given the atmospheric condition and the airspeed.

The particular atmospheric condition monitored and used by the control system ideally is air pressure. This is so because when air pressure is lower, the air is "thinner". In this thinner air the propeller is less effective and the more aggressive angle of attack of the propeller relative to the incoming airflow required to control rotational speed risks stalling the propeller. This problem of thinner air creating less effective propeller thrust is particularly acute at higher altitudes. Thus, at a high-altitude landing strip, say 5000 feet or so, the air is thin enough that applying maximum engine power to the propeller can result in significantly increased rollout distances before takeoff speed is achieved.

Notably, the applicant has gleaned from test data that in order to maximize propeller thrust and minimize rollout distances during takeoff, the power applied to the propeller by the engine should begin at well less than maximum power at the beginning of takeoff (0 kn) and should be increased gradually to full (or nearly full) engine power as the aircraft accelerates to some significant airspeed.

DETAILED DESCRIPTION

Figure 1:
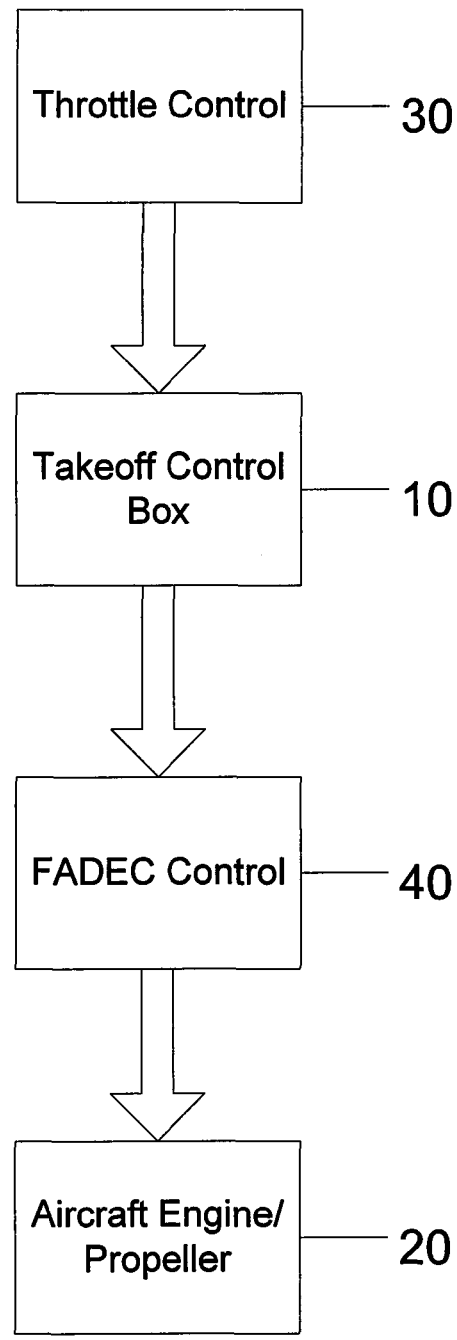
FIG. 1 is the orientation of a control system within an aircraft controlled by a pilot according to an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Generally, it is the nature of an aircraft pilot to demand maximum power (full throttle) from an aircraft engine(s) when taking off. However, the present inventor has discovered that given a particular set of variables (i.e. elevation, engine speed, atmospheric condition, temperature, etc. . . . ), there is a maximum amount of power that can be supplied to the propeller of a piloted propeller driven aircraft before the propeller begins to stall. In effect, at a given air pressure and airspeed, the thrust provided by the propeller begins to decrease as the amount of power supplied to the propeller increases beyond a certain point and the angle of the propeller blade increases beyond the optimum relative to the incoming airflow in order to control propeller rotation speed. This is especially true in light of the substantial increases in the maximum horsepower output of modern aircraft engines. The present inventor has discovered that once data is collected for a particular engine and propeller combination at various airspeeds, elevations, atmospheric conditions, etc., it can thus be determined how much power should be supplied to a propeller under such conditions to result in the optimum propeller blade angle and thus maximum possible thrust. This information and data is extremely important in reducing the takeoff time and distance of a propeller driven aircraft.

Testing and data can be used to accurately reveal the maximum amount of power that can be applied to the aircraft propellers at a given airspeed, engine speed, elevation, and atmospheric condition (pressure, temperature, density, etc. . . . ). It would be extremely difficult, if not impossible, for an aircraft pilot to calculate the exact amount of power that should be applied to the propeller to maximize thrust, and therefore to minimize takeoff time. Therefore, in a preferred example embodiment, the present invention is a control system that examines the testing data, which can be provided in a lookup table, and uses logic for calculating the optimal amount of power that should be applied to the propeller to maximize the aircraft's thrust output for a particular engine given the current conditions. The control system can then determine if the power demanded by the aircraft pilot is greater than the power required to achieve maximum thrust of the aircraft. If the power demanded is greater than the power needed for maximum thrust, the control system can override the request of the pilot and supply the calculated amount of power required to obtain the maximum thrust available. If propeller blade angle is available to the control system on a real-time basis, the engine power can also be directly controlled to this input parameter to maintain the optimum propeller blade angle for any given inflow airspeed. When used during the takeoff of a propeller driven aircraft, the takeoff time can significantly be reduced.

With reference now to the drawing figures, in which like numerals represent like elements or steps throughout the several views, FIG. 1 depicts a control system 10 for controlling a propeller aircraft engine 20 according to an example embodiment of the present invention. The control system 10 is preferably linked between the throttle 30 and the full authority digital engine control, or FADEC, 40 used for digitally controlling the fuel output to the engine 20. However, the control system can be linked between the FADEC 40 and the engine 20, or the control system can be used on a propeller driven plane not having a FADEC 40.

Figure 2:
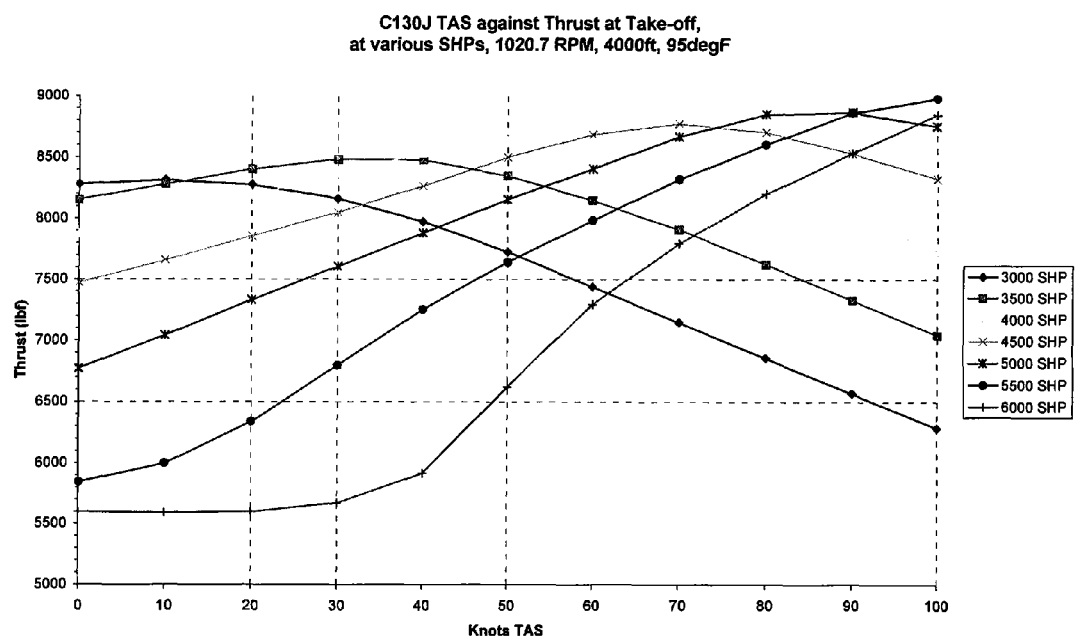
FIG. 2 depicts the logic process of the control system of FIG. 1.

According to a first exemplary embodiment of the present invention, the control system 10 can be any electronically controlled mechanism, or computer, capable of both storing data and calculating optimal power output for a given engine and propeller combination using available input such as engine speed, elevation, atmospheric conditions, etc. Preferably, data is loaded into the control system 10 and contains the amount of thrust produced by the aircraft's engine/propeller combination under these variable conditions. For instance, FIG. 2 charts example thrust outputs for a particular engine/propeller combination versus air speed when the engine produces various levels of horsepower. The data charted in FIG. 2 was obtained when testing a particular engine when the engine is maintained at a constant revolutions per minute (rpm) level of 1020.7 rpm, an elevation of 4000 ft above sea level, and an air temperature of 95 degrees Fahrenheit. The chart of FIG. 2 is but one of many such charts of data that typically would be generated, with other charts representing testing done at different simulated altitudes. Of course, the data is represented here in chart form for easy understanding, while the data itself could be stored in a database for easy electronic retrieval without ever having been displayed on such a chart. As mentioned above, other data measurements can be considered including air pressure, air density, or other measurements related to atmospheric conditions. It is also important to note that while many modern aircraft engines run at a constant rpm for operational reasons, test data could be obtained for different constant engine speeds.

Figure 3:
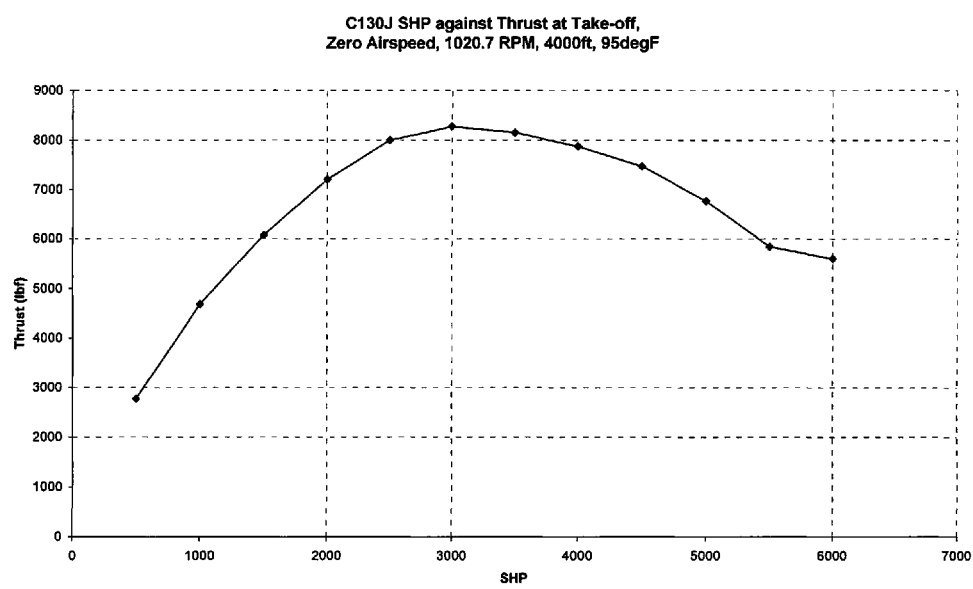
FIG. 3 charts example data of airspeed against thrust at takeoff, at various horsepowers, given constant engine speed, temperature, and takeoff elevation.

The present inventor notes that in many circumstances, the amount of power required to achieve maximum thrust is substantially below full power output for a particular engine. This principle is demonstrated in FIG. 3 showing that the maximum thrust (roughly 8000 lbf) is obtained using only 3000 hp when the aircraft begins its takeoff (zero airspeed) under the same conditions as noted for the data in FIG. 2. The thrust obtained under full power conditions at zero airspeed is roughly 5500 lbf, or approximately 70% of the maximum available thrust. Therefore, in order to minimize takeoff time, a pilot actually needs to apply a fraction of the available horsepower at the beginning of takeoff and steadily increase horsepower as the aircrafts airspeed increases, and subsequently, the amount of air available to the propeller increases. Obviously, this particular set of data points is limited to one particular engine and propeller combination, however, the principle in general can be applied to most modern propeller driven aircraft engines.

Figure 4:
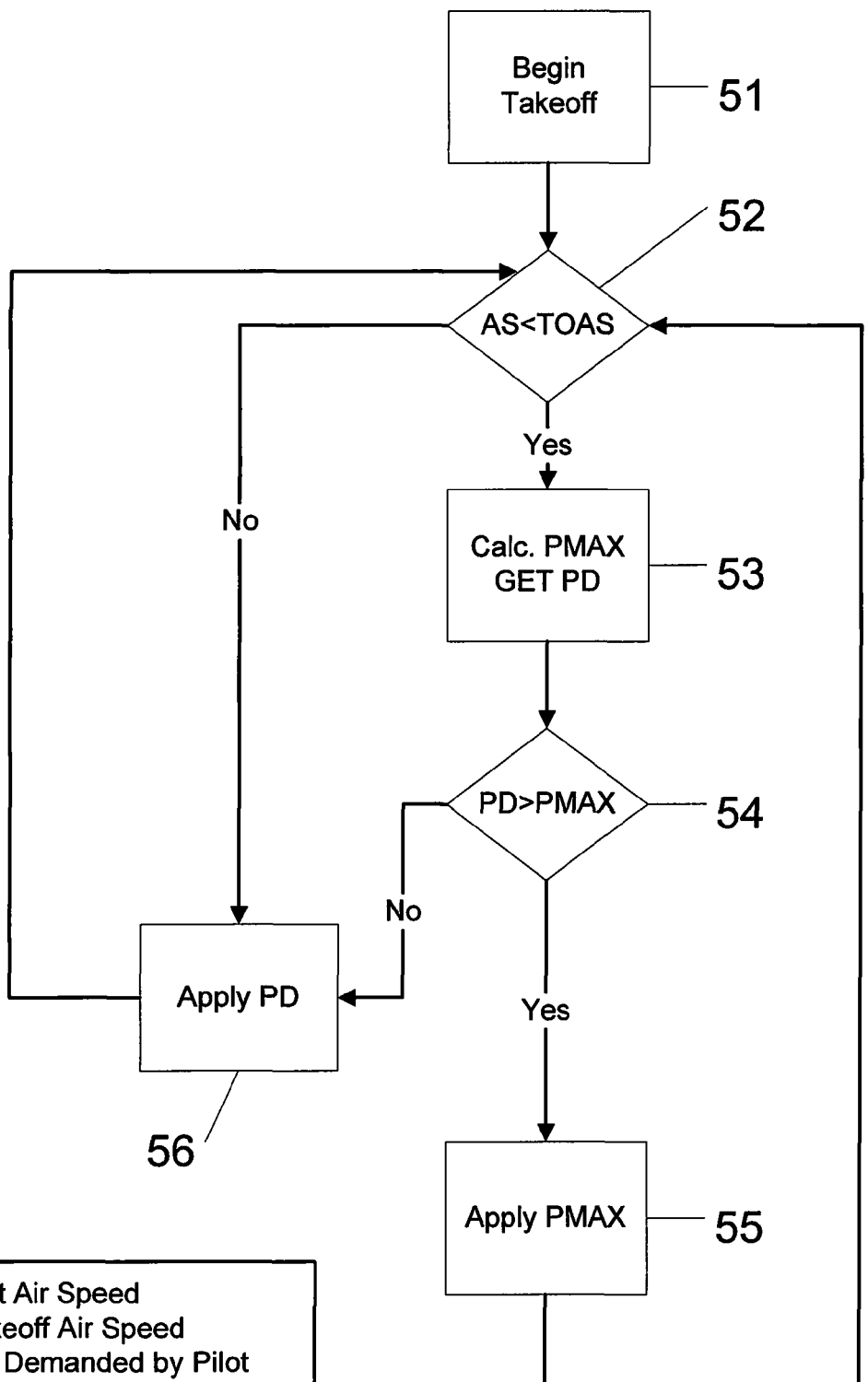
FIG. 4 charts example data of horsepower against thrust at takeoff, given zero airspeed and maintaining constant engine speed, for a given engine speed, temperature, and takeoff elevation.

Preferably, the control system 10 comprises logic for analyzing the stored data, or lookup table, in conjunction with receiving and analyzing the relevant atmospheric and aircraft conditions to determine the amount of power that should be produced by the engine 20 to maximize thrust during take off. While any number of processes can be employed by the control system 10 to determine the appropriate power output of the engine 20, an example logic process 50 is shown and described in FIG. 4. As the propeller driven aircraft begins to takeoff 51 the control system logic 50 first determines if the aircraft airspeed is less than the airspeed required for the aircraft to takeoff. This decision is denoted by numeral 52. As long as the aircraft's airspeed is below the airspeed required to takeoff, the process moves to step 53. In step 53 the control system logic 50 retrieves the power demand PD from the pilot and calculates, looks up or otherwise determines the maximum amount of power PMAX that should be applied during the takeoff. To do this, the system can retrieve the relevant data from a lookup table as described above, or otherwise, and calculates the power that is needed to create the maximum thrust at the propeller, or the maximum effective power. In step 54, the logic 50 determines if the power being demanded by the pilot is greater than the maximum effective power. Thus, the logic 50 compares this maximum effective power to the power being demanded by the pilot at the throttle 30. If the power being demanded by the pilot exceeds the maximum effective power, the logic 50 signals the engine to provide only the maximum effective power according to step 55, as the amount of power in excess of the maximum effective power actually stalls the propeller and slows the aircraft's takeoff time. If the power being demanded by the pilot is less than the maximum effective power, the power being demanded is derived from the engine as called for in step 56. This logic process 50 is a continuous loop such that when the aircraft's airspeed exceeds the airspeed required for the aircraft to takeoff, the power being demanded by the pilot is applied as seen in step 56. Also, it shall be noted that it may be possible to modify this logic process 50 while still maintaining the spirit and scope of the present invention.

In a second, alternative example embodiment, the control system 10 can use the aircraft's air speed as the primary input. In such an embodiment the control system 10 can signal the engine 20 to operate at a fraction of the engine's maximum power output as the aircraft begins its takeoff, and gradually signal an increase in the power output of the engine over the course of takeoff. The increase in power output of the engine can be tied to the airspeed of the aircraft, such that as aircraft airspeed increases, the control system signals for an increase in power output. The initial fraction of power output that the control system signals to the engine at the beginning of the aircraft's takeoff can be based on several factors, including air pressure, density, altitude, etc. . . . or a direct reading of the propeller blade angle if available and comparing it to the optimum for that airspeed and atmospheric condition. The control system 10 can signal the amount of power that should be applied at the engine 20 using the following, or similar, equation:

$$PA = \{x + (1-x)(AS/TOAS)\}$$

Where: PA=power applied at the engine; x=initial fraction of maximum power; AS=airspeed; and TOAS=Take Off Air Speed.

Therefore, when the aircraft's airspeed is zero the control system 10 signals to the engine to apply the fraction (x) of the maximum available power. As the aircraft increases airspeed, the control system 10 is steadily increasing the amount of power created by the engine, such that stalling the propeller is avoiding while producing maximum or near maximum thrust.

In a third, alternative exemplary embodiment, the control system 10 can regulate the amount of power produced by the engine 20 as a function of time as opposed to a lookup table or as a function of airspeed. In this embodiment, during takeoff, the control system 10 begins by signaling the engine 20 to produce a fraction of the maximum available horsepower which is again based on several factors including air pressure, density, altitude, etc. . . . . . The control system 10 then increases the amount of power produced by the engine 20 as a function of time as regulated by the following, or similar, equation:

$$PA = \{x + (1-x)(T/TOT)\}$$

Where: PA=power applied at the engine; x=initial fraction of maximum power; T=elapsed time from initiation of takeoff (or the time elapsed since the pilot demanded full power of the aircraft); and TOT=normal takeoff time calculated or measured for this aircraft under the current conditions.

In this embodiment, when the pilot signals for full power at the throttle 30 during takeoff, the control system 10 increases the power from the initial fraction toward full or near full power as a function of the known takeoff time from release of brakes for the particular propeller driven aircraft under the particular conditions.

While the invention has been described with reference to preferred and example embodiments, it will be understood by those skilled in the art that a variety of modifications, additions and deletions are within the scope of the invention, as defined by the following claims.

What is claimed is:

1. A control system for controlling an engine of an aircraft of the type piloted by a pilot and having at least one propeller powered by the engine, the control system being operative to control the engine during take off and comprising:

an electronic controller operative for controlling the engine while the aircraft is in take off mode and, if so, the electronic controller being operative to provide less than full engine power at the initiation of take off and gradually increases engine power as air speed increases during take off so as to provide substantially maximum thrust for take off despite any pilot demands for maximum engine power during take off, thereby minimizing rollout distance for take off, the electronic controller providing substantially maximum thrust for take off and avoiding stalling of the propeller during take off by determining a maximum effective power to apply to the propeller and comparing the power demanded from the pilot of the aircraft with the maximum effective power, the electronic controller applying the power demanded from the pilot when the power demanded is less than the maximum effective power and applying the maximum effective power when the power demanded from the pilot exceeds the maximum effective power.

2. The control system of claim 1 wherein the maximum effective power of the engine is determined by determining the maximum thrust that can be developed by the propeller at the present air speed and ambient air pressure or altitude, and determining the appropriate engine power level for producing that maximum thrust.

3. The control system of claim 1 wherein the maximum effective power is determined based on air speed of the aircraft and ambient conditions.

4. The control system of claim 3 wherein the ambient conditions comprise air pressure.

5. The control system of claim 3 wherein the ambient conditions comprise altitude.

6. The control system of claim 3 wherein the maximum effective power is determined by accessing a lookup table containing performance data for the engine and propeller over a wide range of take off conditions.

7. The control system of claim 6 wherein the lookup table contains performance data for the engine and propeller operating at different power output levels over a variety of altitudes or air pressures, whereby for a given altitude or air pressure, the engine power level that develops maximum thrust for the present air speed can be determined, thereby maximizing thrust while avoiding stalling the propeller.

8. The control system of claim 1 wherein the maximum effective power is determined based on air speed and propeller blade angle.

9. The control system of claim 1 wherein the maximum effective power is determined according to the formula PME=PMAX(X)+(1−X)(AS/TOAS), where PME is the maximum effective power to apply to the propeller, PMAX=maximum available power, X is a fraction between 0 and 1 representing an initial power level to apply at the beginning of take off, AS is air speed, and TOAS is the aircraft's rated take off air speed.

10. The control system of claim 1 wherein the maximum effective power is determined based on elapsed time from the initiation of take off.

11. The control system of claim 1 wherein the maximum effective power is determined according to the formula PME=PMAX(X)+(1−X)(T/TOT), where PME is the maximum effective power to apply to the propeller, PMAX=maximum available power, X is a fraction between 0 and 1 representing an initial power level to apply at the beginning of take off, T is elapsed time from the initiation of take off, and TOT is the aircraft's rated time for take off.

12. A method of controlling an engine in an aircraft for take off, the aircraft being of the type having at least one propeller powered by the engine, the method comprising:
monitoring air speed and an ambient condition during take off;
determining a maximum effective engine power level that can be applied to the propeller at that moment without stalling the propeller under the circumstances of the air speed and the ambient condition; and
controlling the engine to deliver no more than the maximum effective power to the propeller, thereby limiting the power applied to the propeller to the maximum effective power that can be applied without stalling the propeller, despite a nominal pilot demand for substantially full power.

13. The method as claimed in claim 12 wherein the ambient condition and the airspeed are compared with a lookup table to determine the appropriate engine power level that produces maximum thrust for the present ambient condition and airspeed.

14. The method as claimed in claim 13 wherein the ambient condition is air pressure or a condition that varies with or is indicative of air pressure.

15. The method of claim 12 wherein the method is operative to provide less than full engine power at the initiation of take off and gradually increases engine power as air speed increases during take off so as to provide substantially maximum thrust for take off, thereby minimizing rollout distance for take off.

16. A method of controlling an engine of an aircraft during take off, the aircraft having at least one propeller powered by the engine, the method comprising:
using the airspeed of the aircraft and an ambient condition as inputs to limit engine power so as to maximize propeller thrust, rather than maximizing engine power or engine speed during take off, despite a nominal pilot demand for full engine power during take off, wherein the propeller is provided with less than full engine power at the initiation of take off and engine power is gradually increased as air speed increases during take off so as to provide substantially maximum thrust for take off, thereby minimizing rollout distance for take off.

17. The method of claim 16 wherein the ambient condition is altitude.

18. The method of claim 16 wherein the ambient condition is air pressure or another ambient condition that varies with or is indicative of air pressure.

* * * * *